_United States Patent_ [19]

Ortlip

[11] Patent Number: 4,630,773

[45] Date of Patent: Dec. 23, 1986

[54] METHOD AND APPARATUS FOR SPREADING FERTILIZER

[75] Inventor: Earl W. Ortlip, Carefree, Ariz.

[73] Assignee: Soil Teq., Inc., Waconia, Minn.

[21] Appl. No.: 827,225

[22] Filed: Feb. 5, 1986

Related U.S. Application Data

[63] Continuation of Ser. No. 668,736, Nov. 6, 1984, abandoned.

[51] Int. Cl.$^4$ ............... B05B 17/00; B05B 17/04; B05B 9/06
[52] U.S. Cl. ............................................ 239/1; 239/11; 239/155
[58] Field of Search ............... 239/155, 156, 656, 1, 239/11; 222/613, 614

[56] References Cited

U.S. PATENT DOCUMENTS

| 3,073,606 | 1/1963 | Hurt | 239/656 |
|---|---|---|---|
| 3,101,175 | 8/1963 | Brown, Jr. | 239/155 X |
| 3,468,379 | 9/1969 | Rushing et al. | 172/2 |
| 3,677,540 | 7/1972 | Weiss | 222/23 |
| 3,785,564 | 1/1974 | Baldorchi | 239/172 |
| 4,015,366 | 4/1977 | Hall, III | 47/1 R |
| 4,052,003 | 10/1977 | Steffen | 239/155 X |
| 4,226,366 | 8/1980 | Nörtoft | 239/69 |
| 4,277,022 | 7/1981 | Holdsworth | 239/7 |
| 4,350,293 | 9/1982 | Lestradet | 239/155 |
| 4,358,054 | 11/1982 | Ehrat | 239/155 |
| 4,376,298 | 3/1983 | Sokoi et al. | 364/551 |
| 4,422,562 | 12/1983 | Rawson | 222/55 |

FOREIGN PATENT DOCUMENTS 2080082  2/1982  United Kingdom .

Primary Examiner—Andres Kashnikow
Assistant Examiner—Patrick N. Burkhart
Attorney, Agent, or Firm—Merchant, Gould, Smith, Edell, Welter & Schmidt

[57] ABSTRACT

Fertilizer spreading apparatus includes a vehicle carrying a plurality of product bins, each for carrying a fertilizing product. Feeder devices are provided to meter product from the bins which is collected and spread over the field to be fertilized. A computerized control system is provided which holds a digital soil map of the location of various soil types in the field to be fertilized and is responsive to vehicle location means for determining the location of the vehicle in the field, looking up the type of soil the vehicle is currently over based on its location, and adjusting feeder operation in response thereto. The method further includes the steps of acquiring an aerial photograph of the field to provide the digital soil map and for testing the various soil types in the field for fertilizing requirements and inputting the information into the control system whereby product rates may be varied according to the soil type.

18 Claims, 8 Drawing Figures

METHOD AND APPARATUS FOR SPREADING FERTILIZER

This is a continuation of application Ser. No. 668,736 filed Nov. 6, 1984, now abandoned.

TECHNICAL FIELD OF THE INVENTION

The present invention pertains generally to applying fertilizer to agricultural land and more particularly to method and apparatus for applying specific fertilizer blends to each of the various different soil types found in a field.

BACKGROUND OF THE INVENTION

Any given field in agricultural lands is typically comprised of several different soil types, each of which may be categorized according to the relative proportions of sand, clay and silt it contains. While there are twelve generally accepted soil categorized or types, these categories generally fall into three broader categories, i.e. sandy, clay or loam. Sandy soils have the least capacity to hold water and nutrients and thus require the most fertilization, while clay soils have the greatest capacity to hold water and nutrients and thus require the least fertilization. Loam soils consist of a combination of sand, clay and silt and have fertilization requirements between those of sandy and clay soils. Although any given field may not include all three of the above described soil types, it would be most unusual if it did not include at least two substantially different soils having substantially different fertilization requirements.

Most fields contain one dominant soil type which covers the majority of the field area with the remaining area made up of other different soil types distributed around the field in various relatively smaller areas having curvilinear boundaries which often, but not necessarily, correspond to low or high spots. Ideally, each of the individual areas of different soil should be treated independently for the purpose of fertilization. However, heretofore there has not been any efficient, practical and economical fertilizing method or equipment for this purpose. Thus, the almost universal practice is to fertilize the entire field according to the needs of the most deficient soil, or according to the averaged requirements of the different soils. The result is that a substantial area of the field receives more and in the latter case less fertilizer than it requires, resulting in significant waste of expensive fertilizer and potentially lowering yields in less than optimally fertilized areas.

Thus, there has long been a need for an economical method and apparatus for applying fertilizer according to the needs of each different area of different soil type in a field. As will be demonstrated below, the present invention provides such method and apparatus.

SUMMARY OF THE INVENTION

The present invention provides a method and apparatus for applying fertilizer according to the specific needs of each individual type of soil comprising a field. According to one aspect of the invention a digitized soil map of a field to be fertilized is assembled as follows. First, an aerial infrared photograph of the area to be mapped is acquired. As the organic content of each soil type in the field is closely related to its moisture content, the photograph produces a comparatively accurate soil map in which the various soil types are represented by different shades corresponding to the different moisture contents of the soil types. Next, the infrared photograph is digitized into an array of pixels such that each pixel represents a discrete portion of the total field area and such that each pixel is assigned a discrete digital value (based on the shading in the photograph) such that the value is representative of the soil type the pixel represents. Finally, the digitized map is enhanced by removing artifacts and by simplifying the map by combining closely akin soil type areas together or combining very small spots of variant soil type with the dominant surrounding soil. Finally, the digitized soil map is recorded in a nonvolatile medium, preferably a programmable read only memory, or PROM, chip.

According to another aspect of the invention there is provided a fertilizer blending and spreading truck. The truck has mounted thereon a plurality of bulk component bins for containing granular fertilizers, one or more accessory bins for granular micronutrients and one or more liquid tanks for liquid herbicide or insecticides. The truck further includes mounted thereon a plurality of feeder means for dispensing product contained in the bins or tanks and means for collecting dispensed products and distributing the products over the soil. Each of the feeder means includes feeder control means via which the rate of product dispensation may be controlled by a feeder control signal. A control system is also mounted on the truck and includes an x-y locator for producing longitude and latitude coordinate signals indicative of the current longitude and latitude of the truck, a speed indicator for producing a truck speed indicating signal, computer means including means for interfacing with the digitized soil map PROM and for receiving the longitude, latitude and speed indicating signals, and terminal means for introducing setup or control information to the computer means. Prior to fertilizing a field, the particular fertilization requirements of each soil type are determined, and the desired rate of delivery of each product for each soil type contained in the field is entered into the computer means via the terminal means. In addition, the products to be applied to the field are loaded into the various bins and tanks of the truck and the location of the products relative to the bins and tanks is also entered into the computer means via the terminal means. As a final initializing step, a starting position of the truck relative to the soil map in the field is entered into the computer means, which corollates the starting position with a base longitude and latitude coordinate signal received from the x-y locator. In a fertilizing mode of operation the computer means may then determine the position of the truck relative to the soil map by monitoring the current longitude and latitude coordinates of the truck, determine the type of soil which the truck is currently over, and adjust the rate of dispensation of products for distribution in accordance with the current soil type and speed of the vehicle (as may be determined by monitoring the speed indicating signal).

Thus, as summarized above the present invention provides a method and apparatus for applying a custom blend of fertilizer to each of the different soil types found in the field, such that an optimum blend may be applied to virtually the entire field. The abovedescribed and other features of the invention are described in detail in the ensuing specification.

DETAILED DESCRIPTION OF THE INVENTION

Figure 1:
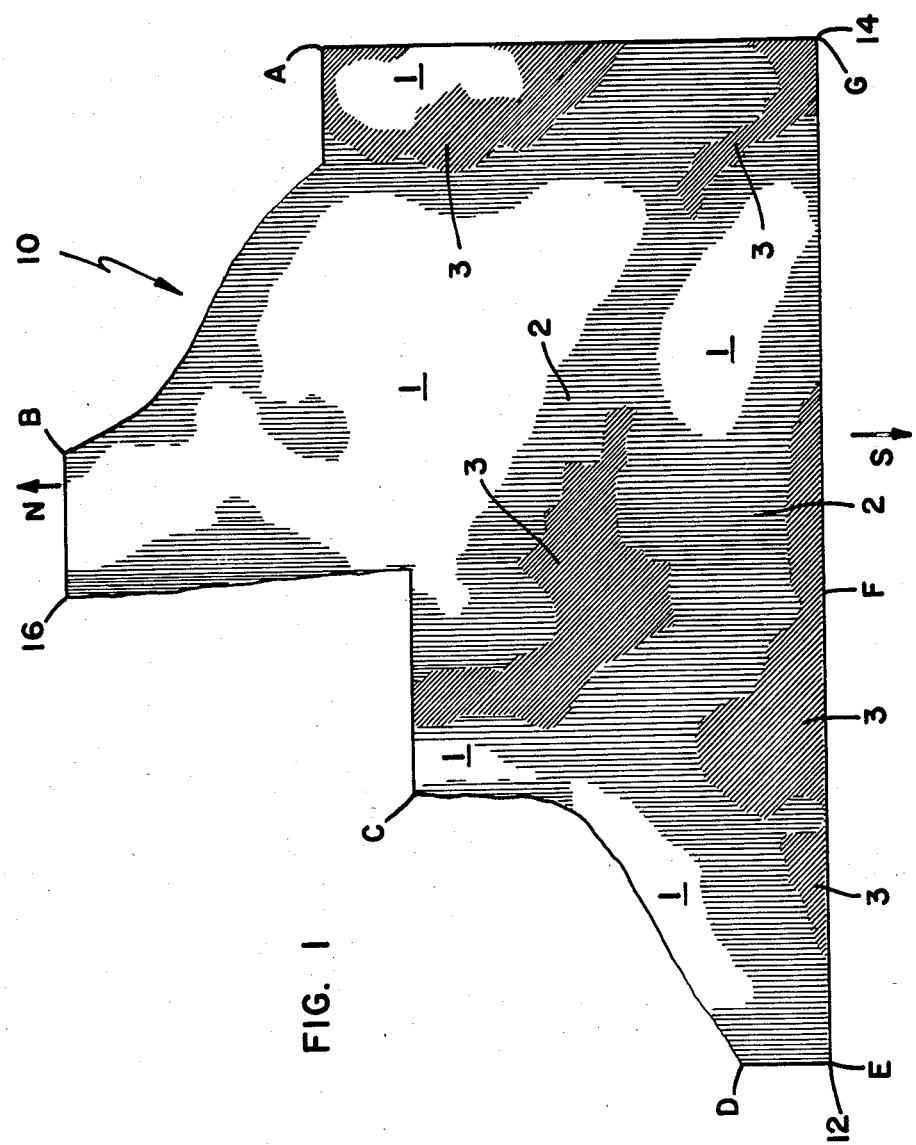
FIG. 1 is an exemplary digitized soil map according to the present invention.
Figure 2:
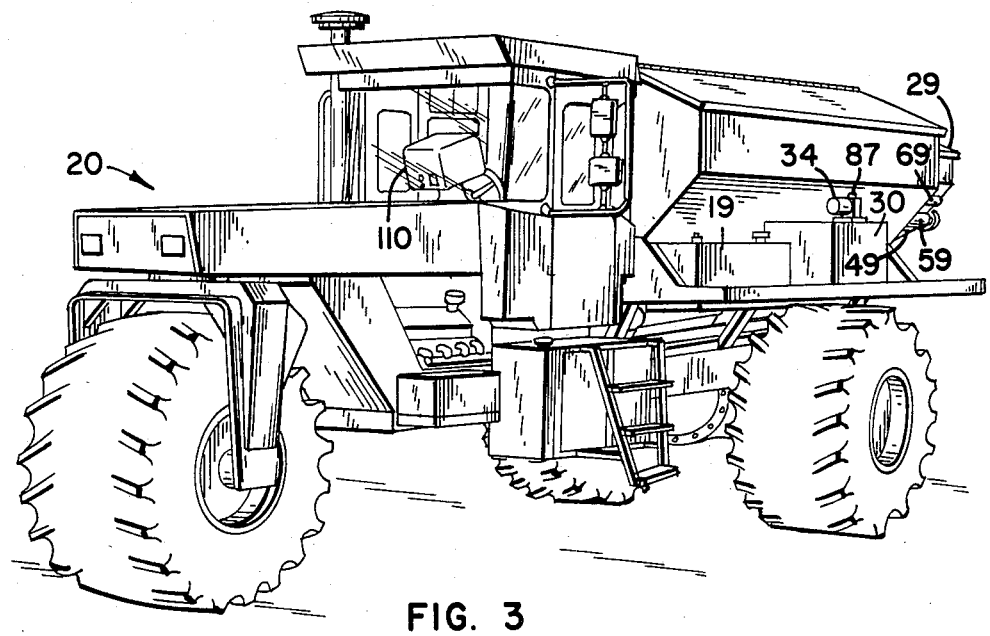
FIGS. 2–4 are various mechanical views of the blending and spreading apparatus according to the present invention.
Figure 3:
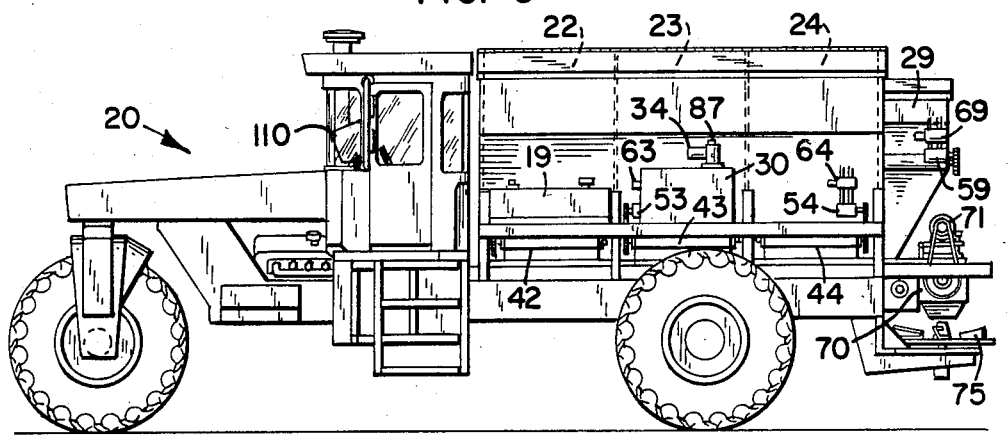
Figure 4:
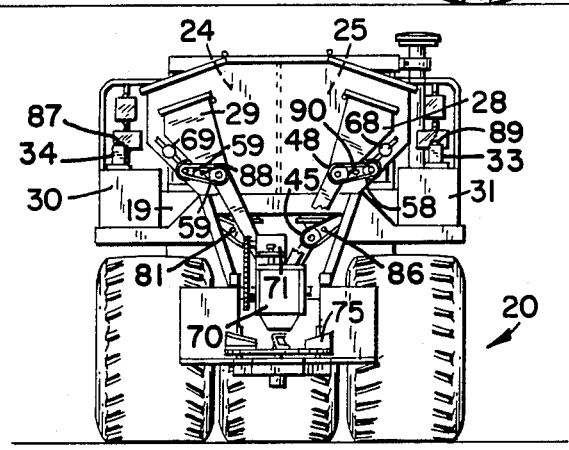

As summarized above, the present invention provides a method and apparatus for applying fertilizer according to the specific needs of each individual type of soil comprising a field. Broadly speaking, the present invention provides a method for acquiring a digitized map of the various soil types contained in a field and apparatus utilizing the map to apply specific custom fertilizer blends or grades to each of the various soil types. Thus, for instance, areas of sandy soil may be treated differently than areas of clay or loam such that an optimum fertilizer grade may be applied to each.

The present invention capitalizes on the different moisture retainment properties of different soil types in order to generate a digitized soil map. As a first step an aerial infrared photograph of the area to be mapped is acquired by conventional techniques. Because the organic content of each soil type is closely related to its moisture content, the photograph produces a comparatively accurate soil map in which the various soil types are represented by different shades corresponding the different moisture contents of the soil types.

As a second step, the infrared photograph is digitized by conventional computer digitization techniques. Preferably, a photograph representing a square section of land is translated into a 250×250 array of pixels such that each pixel represents 1/62500 of the total area. Thus, for a ½ mile×½ mile square area each pixel would represent a 10.6 ft.×10.6 ft. area. Although the exact size of the section translated is not critical to the invention, it preferably should be sized to provide adequate, but avoid needless, resolution. At present, the present invention contemplates resolution in the range of five to fifty ft./pixel side. By the digitization process, each pixel is assigned a discrete digital value based on the shading of the photograph, such that the value is representative of the soil moisture content, i.e. type, of the area it represents. Such value may, for instance, correspond to an average moisture content of the entire pixel area or it may correspond to the lowest moisture content in the area, which content would correspond to the most deficient soil contained therein. Preferably, a range of values are utilized such that, for instance, a value of 0 would be assigned to the coolest soil and a value of 7 or 15 would be assigned to the hottest soil, with intermediate temperatures assigned intermediate values. In any event, it is not critical to the invention what scheme is used to assign values to the pixels so long as the value is fairly representative of the soil type of the area it represents. It should be noted, however, that the infrared photograph does not reveal in the absolute sense specific soil types, but rather, more accurately, the areas of different soil relative to one another. This information is, however, quite sufficient for the purposes of guiding fertilizer application because its essential function, as will be seen below, is to merely differentiate between areas of different soil type in a field.

The third step in the process of producing a useful digitized soil map relates to interpreting and enhancing the digital map produced in step two. The primary purpose of enhancement is to remove artifacts of questionable accuracy and to simplify the map while maintaining the bulk of its useful information content. Although in the strictest sense simplification is not critical to the present invention, it is preferred for practical reasons. For instance, closely akin soil types have very similar fertilization requirements and thus may be treated the same for the purposes of fertilization without significant loss of treatment specificity. Or, very small spots of varying soil type which are not worth treating individually may be treated the same as the dominant surrounding soil. Accordingly, the present invention preferably provides that the enhanced map differentiate between a maximum of only three different catagories or types of soil. It should be noted, however, that the three categories do not necessarily correspond to sandy, clay or loam soils respectively, but rather the categories are relative to one another only. Thus, for example, the different soil type areas delineated in a particular enhanced map may correspond to three different qualities of loam soil each of which vary sufficiently from one another to warrant different treatment. In fact, it is possible that the same soil type may require different treatment depending on its location in the field. In any event, in the prefered embodiment each pixel of the enhanced soil map has associated therewith one of three different soil type values. However, it shall be understood that more values could be used to provide greater differentiation, and correspondingly that the invention is in no way limited to a three value or soil type system.

Referring to FIG. 1 there is illustrated an example enhanced soil map 10 of one field. Map 10 encompassed 25 acres of land, with soil types "1", "2" and "3" (light, medium and dark respectively) constituting 5, 12 and 8 acres of the field respectively. Although the various boundaries of the soils are shown having somewhat "analog" or continuously curved boundaries, it shall be understood that the digital representation of the map provides for discrete step changes in the boundaries such that each boundary is actually represented in a geometric fashion. As digitized, the southwest (lower left hand) corner 12 of map 10 would correspond to (x,y) pixel coordinates (1,1) with the southeast (lower right hand) corner 14 corresponding to pixel coordinate (250,1). Given a field distance of approximately 1800 ft. from corner 12 to corner 14 each pixel would thus correspond to a 7.2 ft.×7.2 ft. square area. Although map 10 does not encompass a square area, it shall be understood that the y axis of the map would be scaled 1:1 with the x axis, such that corner 16 of map 10 would correspond approximately to pixel coordinate (120, 170). Moreover, it is not necessary that any of the pixel array corner coordinates (1,1), (250,1), (1,250), (250,250) lie within or on the boundaries of the field map, but rather it is only necessary that the field map be contained within the boundaries of the pixel array. However, it is important that the directional orientation of the field map have a predetermined relationship with the pixel array. For instance, as is preferably practiced in the present invention, the east-west and north-south axes of the field map are aligned with the respective x and y axes of the pixel array. This permits, as will be explained more fully below, the apparatus of the present invention to relate longitude and latitude coordinates to map pixel coordinates in a straight-forward manner.

As the final step in the process of developing a digitized map for utilization by the apparatus of the present invention (described below), map 10 is preferably transferred from the memory of a computer (or any magnetic medium on which it is stored) to an eraseable programmable read only memory or (E)PROM. In addition to the soil map, the PROM is preferably further programmed with a PROM existence code, a PROM I.D. number, a scale factor (the length of one map edge in ft.), and sixteen field entrance points. The use of these parameters by the apparatus of the present invention will be described hereinlater.

Referring now to FIGS. 2-5 the fertilizer blending and spreading apparatus according to the present invention will be described. A tractor or truck 20 is provided and has mounted thereon six bulk component (granular fertilizer) bins 22-27, two accessory bins 28 and 29 for micronutrients (granular), and two accessory liquid tanks 30 and 31 for liquid herbicide and liquid insecticide. Eight rotary feeders 42-49 are provided to feed product from bins 22-29 onto a chain conveyer 70, which collects products from the various bins and tanks and transports them to a rotary spreader 75. Feeders 42-49 include hydraulic motors 52-59 and hydraulic control valves 62-69 respectively. In operation, the turning rate of each rotary feeder is controlled by the application of an analog voltage signal applied to its respective hydraulic control valve. Pump feeders 33 and 34 (shown in block schematic form) are also provided to meter product from the respective tanks 30 and 31 to conveyer 70. Preferably, pump feeders 33 and 34 meter liquid product in a spray form to the rear end of the conveyer such that the product is deposited on bulk products being carried by the conveyer. Nozzled hoses 38 and 39 are provided for this purpose. As in the case of rotary feeders 42-49, pump feeders 33 and 34 are also operative in response to an analog voltage signal by which the rate of liquid product delivery may be controlled. Preferably, conveyer 70 includes an on/off relay so that it may be remotely controlled. When on, it is preferably driven at a constant rate via hydraulic motor 71 to carry products from the bins and tanks to rotary spreader 75, which also preferably includes an on/off relay, and is driven at a constant rate when on. A source of pressurized hydraulic fluid 19 is provided on tractor 20 for operating the various hydraulic components.

Also provided on vehicle 20 are sensors 80-90 which monitor the operation of feeders 31-35 and 42-47, and conveyer 70 and produce an electrical failure signal if a component fails to operate. Preferably, where the feeders include chain and sprocket drive mechanisms magnetic gear tooth sensors are utilized. However, any suitable sensor may be utilized for the purpose of providing a failure indication. Although not shown in the mechanical views of FIGS. 2-5, there is also preferably provided bin and tank content sensors (preferably photoelectric) for indicating an "empty" condition.

Figure 5:
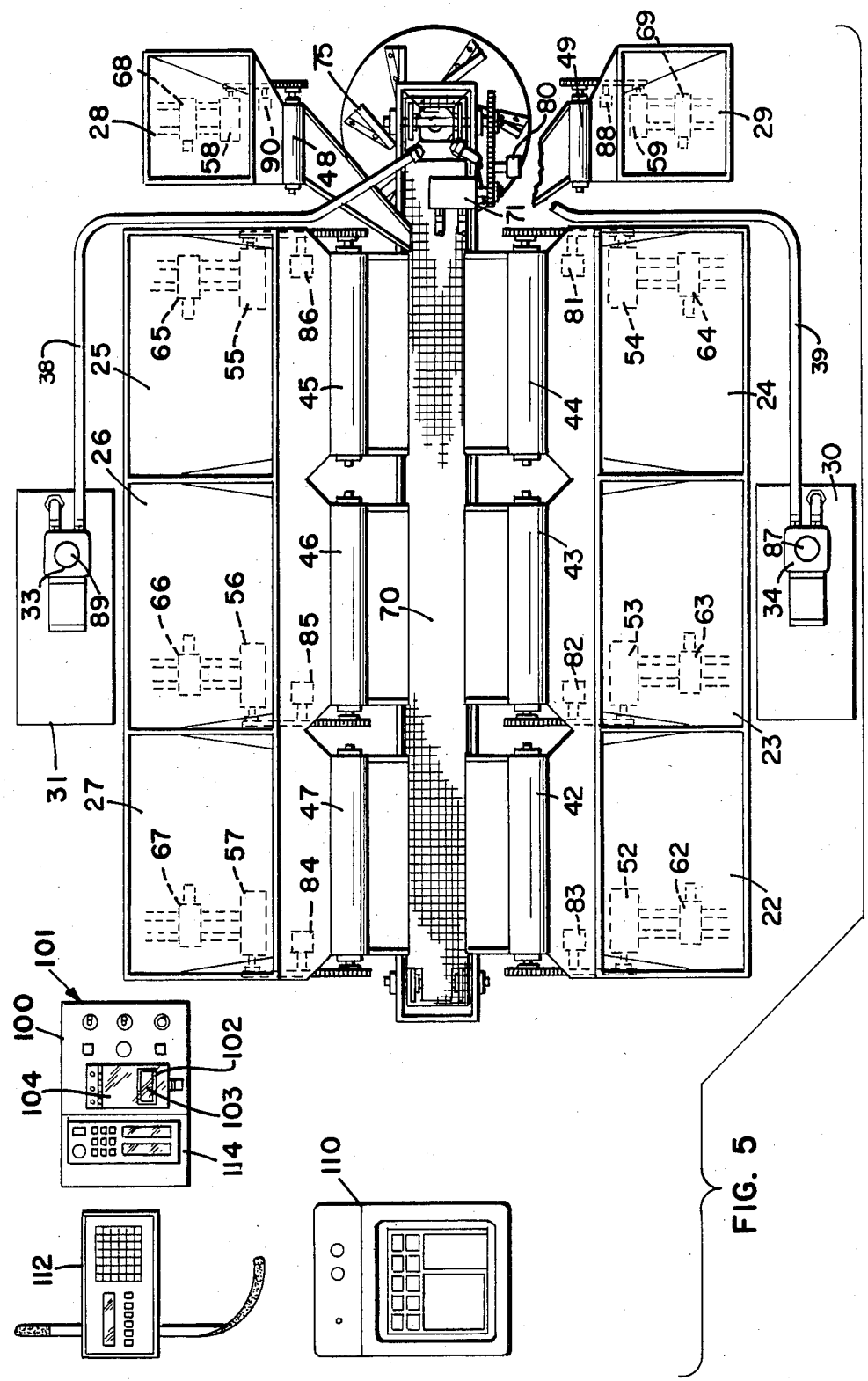
FIG. 5 is a mechanical schematic view of the blending and spreading apparatus according to the present invention.
Figure 6:
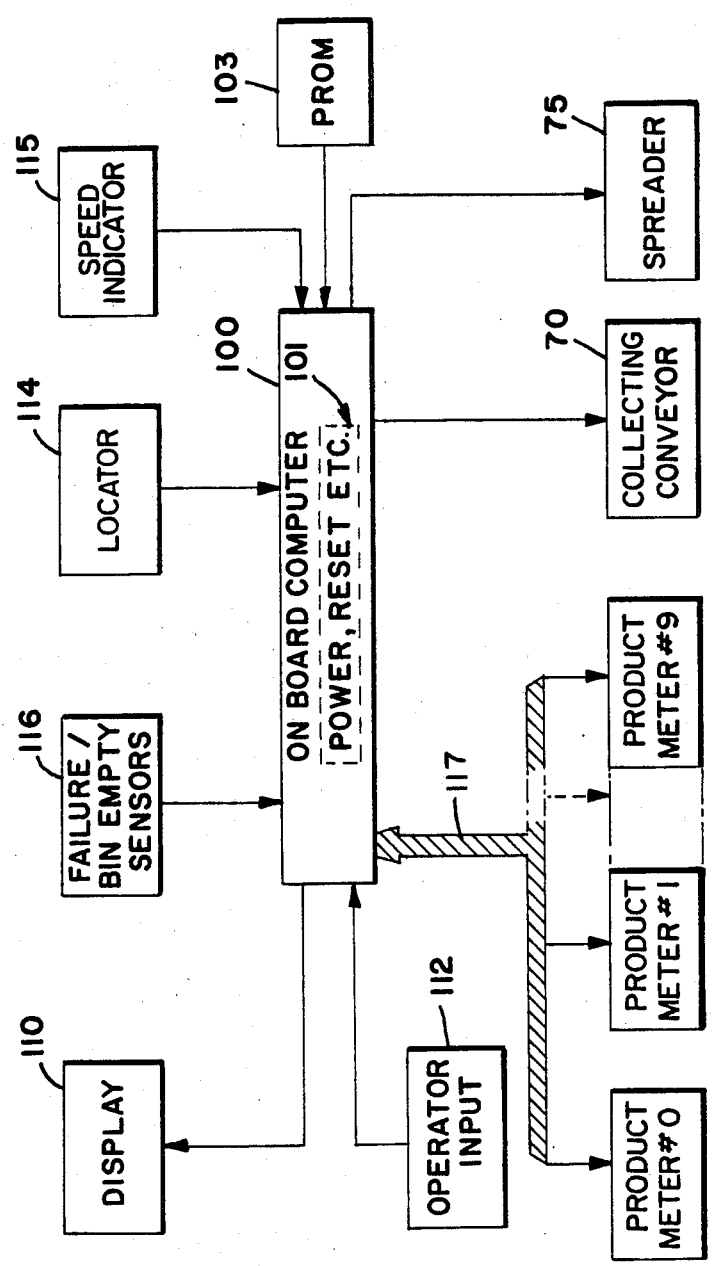
FIG. 6 is a simplified block diagram of the control system according to the present invention.

Referring now to the system block diagram of FIG. 6 in conjunction with the mechanical schematic view of FIG. 5, the system for controlling the metering of products to conveyer 70 as the tractor 20 traverses a mapped field will be described. An "on-board" microprocessor-based computer 100 is provided and is preferably mounted in the cab of the truck. Computer 100 includes conventional power, reset and system activation switches 101, and includes on the housing thereof a dual in-line socket 102 for receiving a PROM 103 carrying a soil map. A hinged cover 104 is provided for keeping contaminents from socket 102. Also mounted in the cab is a CRT display 110, an operator input alphanumeric keyboard (including function keys and a one line display) 112, and a LORAN navigation unit or x-y locator 114. Also mounted on truck 20 but not in the cab is a speed indicator 115 which preferably operates on radar principles. On board computer 100 is electronically interfaced with all the above-described components 103, 110, 112 and 114, as well as failure and bin sensors 116 (i.e. failure sensors 80-90 and the bin and tank content sensors described with respect to FIG. 5). The particular hardware used to interface computer 100 with the various components is not critical to the invention and thus will not be described. However, it shall be understood that whatever hardware is used it should provide any necessary signal translations, i.e. from analog to digital or parallel to serial, etc.

LORAN locater unit 114 operates on well known principles of LORAN navigation to generate digital location information for input to computer 100. As is well known in navigation, a LORAN unit generates location information in latitude and longitude format in degrees, minutes and seconds. Speed indicator 115 preferably operates on radar principles to provide a continuously updated digital speed signal indicative of the speed of truck 20.

Computer 100 receives input from PROM 103, operator input 112, locator 114, speed indicator 115 and failure and bin empty sensors 116 to control collecting conveyer 70 (on/off), spreader 75 (on/off), and product meters 0-9, (product meters 0-9 schematically correspond to the various product feeding or metering apparatus described with reference to FIG. 5.) As indicated in FIG. 6, computer 100 is electrically interfaced with product meters 0-9 via which the rate of product delivery may be controlled. Preferably, interface 117 includes a frequency to voltage converter which produces a voltage signal proportional to the frequency of an applied AC signal. Accordingly, computer 100 may control each of feeders 33, 34 and 42-49 through variable frequency output signals, which signals may be generated via a plurality of internal timers. As also depicted in FIG. 6, computer 100 is further electrically interfaced with collecting conveyer 70 and spreader 75, such that they may be turned on and off via their respective on/off relays. Generally speaking, the system thus provides that as tractor 20 traverses a mapped field computer 100 monitors the (x,y) location information generated by locator 114 to determine the location of the tractor 20 relative to the soil map contained in PROM 103. Based on the relative location of the tractor the particular type of soil the tractor is currently over in the field may be determined, such that the proper fertilizer for that soil may be blended and spread on-the-go via the various blending and spreading apparatus. In addition, computer 100 maintains a display of the soil map on CRT display 110, together with a truck position cursor indicative of the truck's position relative to the map. Other status information, for example the contents of the various bins and tanks, or vehicle speed, may also be displayed.

Figure 7:
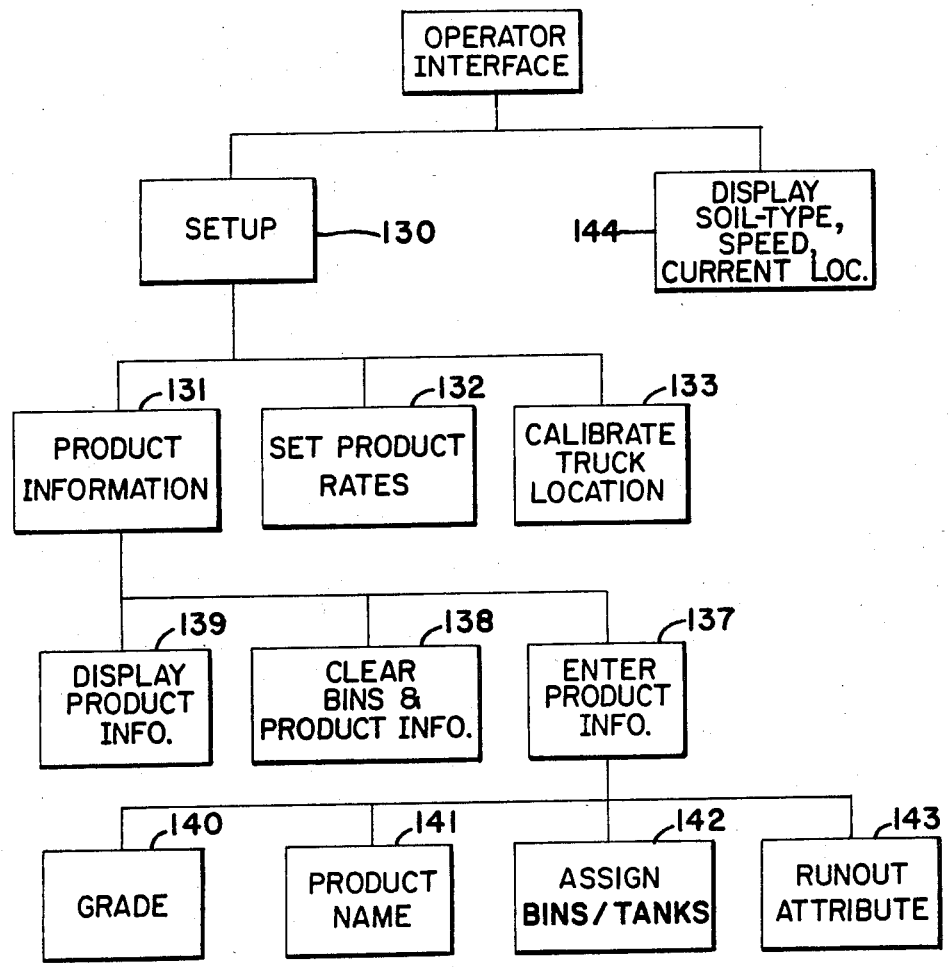
FIG. 7 is a simplified block diagram of the operator interface and system setup functions according to the present invention.

To accomplish the above operation it is necessary to setup or initialize the system with various data. Referring to FIG. 7, which is a functional block diagram illustrating the setup procedure and the information entered thereby, the initialization of the system will be described. Setup information may be viewed or entered into computer 100 via operator interface 112, which as explained above includes an alphanumeric keypad and a one-line display. Setup procedure 130 involves the entry of three basic types of information, i.e. product information 131, product rate information 132 and truck location calibration information 133. The three basic aspects of product information 131 entry involve the actual entry of product information 137, the clearing of product information (and bin association) 138 and the display of product information 139 currently in the system.

Product information 131 is preferably entered in the sequence of grade 140, the product name 141 the assignment of the product to a bin 142 and the runout attribute of the product 143. Preferably, this aspect of the initialization process of the present invention provides that each of the products to be carried in the bins or tanks of truck 20 are assigned to a particular bin or tank for reference by computer 100. Accordingly, computer 100 is informed of the product content of each of the various bins and tanks of the blending equipment. Where two or more bins are to carry the same product the system of the present invention provides for the "chaining" of the corresponding bins (or tanks), which chaining information is also entered during product information entry 137. By the process of chaining certain bins together, the computer 100 may automatically switch between bins during a fertilizing operation. For instance, where two bins carry the same product, product is metered to the collecting conveyer 70 via a first bin until that bin is empty, at which time the second bin may be automatically called upon for a continuing supply.

Preferably, each product carried by the vehicle 20 has a runout attribute associated therewith. This permits computer 100 to selectively runout certain excess products after the field has been once fertilized. More specifically, if a particular product may be applied in excess without causing harm to the soil, it would have an affirmative runout attribute, while products which may harm the soil if applied in excess would have a negative runout attribute. Accordingly, computer 100 may inhibit distribution of certain products during runout.

The other two aspects of product information 131 entry involves the review or display (via the one line display of interface 112) of product information 139 currently resident in computer 100, or the clearing of product information and bin association from the computer 100, as may be desired for verifying entered information or for clearing old information prior to entering new information.

Once the product information 131 has been entered to computer 100, the operator must set the product rates (132) (i.e. the quantity of product to be delivered per acre) for each individual product for each of the three possible soil types. To determine the desired rates, samples are taken from each different soil type to be treated, and the samples analyzed to determine what the individual product rates should be for each different soil type. Accordingly, a specific rate for each of the three normally applied bulk components potash, nitrogen and phosphate would be developed for each soil type. Likewise, specific rates for micronutrients, herbicides and insecticides could also be determined. Preferably, product rates are entered in cubic feet per acre, which rate computer 100 utilizes to calculate the number of cubic feet/sec which must be delivered to spreader 75 in order to achieve the desired application. As inferred, the number of cubic feet/sec of any particular product delivered to the spreader and thus soil may then be varied by computer 100 (via the various product meters) according to the type of soil the product is being applied to and the speed of the truck 20.

Once all product information including the rates of delivery of each product for each soil type has been entered, the location of truck 20 relative to the PROM soil map may be calibrated (133). As mentioned above, PROM 103 preferably includes stored therein a plurality of field entrance points. Referring to FIG. 1, there is indicated thereon several such entrance points A-G, each of which have associated therewith stored in the PROM 103 pixel coordinates. For instance, entry points E and G have associated therewith the respective pixel coordinates of (1,1) and (250,1). Preferably, there is included at least one entrance point on each generally opposite side of the field, with as many of the entrance points corresponding to established field accesses or points in the field boundary easy to associate with a particular point on the field map. Accordingly, prior to commencing traversing the field to apply fertilizer, the operator enters into computer 100 which field entry point the truck will start in the field, such that computer 100 is informed of the position of the truck with respect to a known pixel location on PROM map. Thus initialized as described above, the blending and spreading apparatus of the present invention is prepared to apply fertilizer products to a mapped area.

Figure 8:
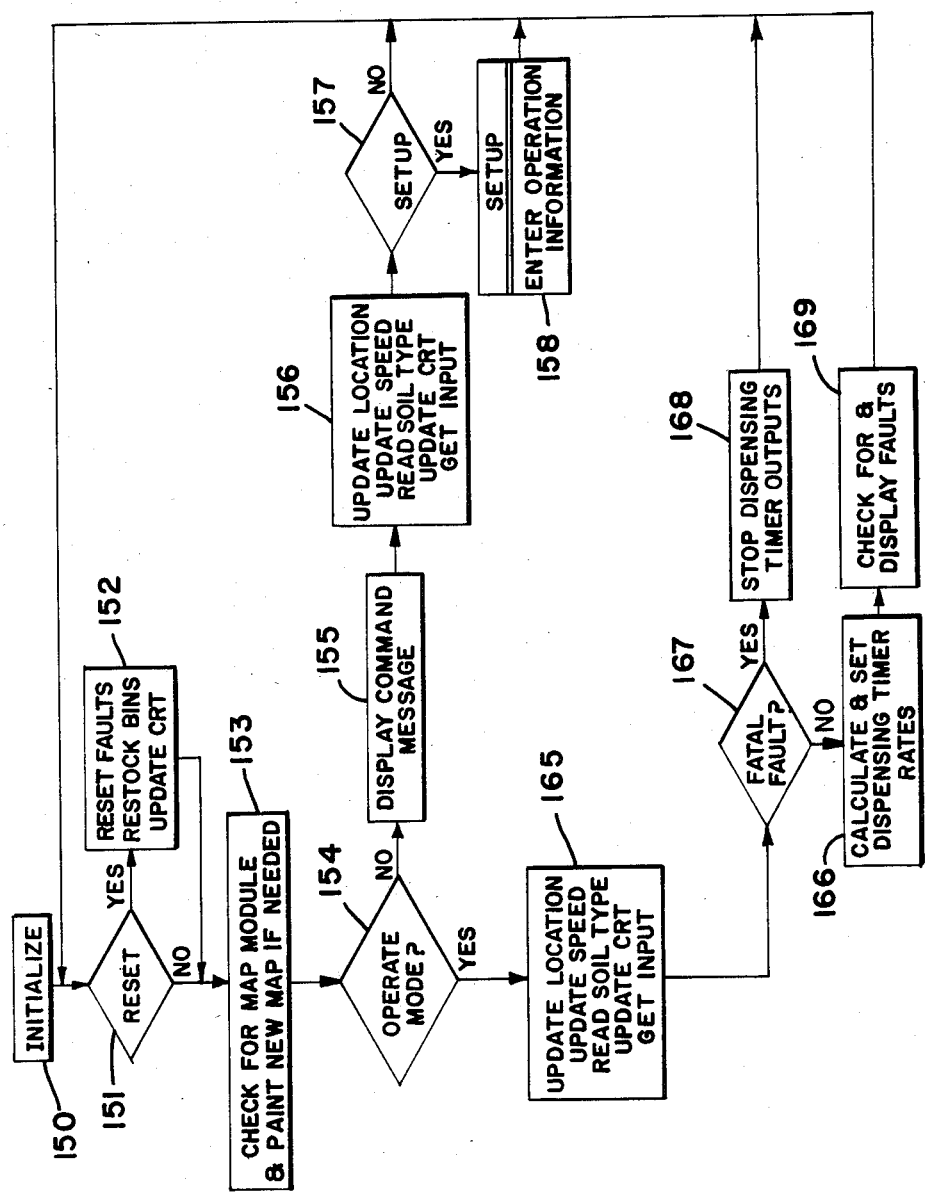
FIG. 8 is a simplified flow chart of the control system software according to the present invention.

Referring to FIG. 8, there is shown a simplified flow chart of the software utilized in computer 100 to accomplish its various tasks. A power up initialize routine 150 is provided whereby computer 100 may initialize various components of the system or internal parameters. For instance, initialize routine 150 provides for initializing operator input keyboard 112, a graphics controller card for driving CRT 110, communications parameters for interfacing with the locator 114 and speed indicator 115, I/O port parameters in computer 100 and certain working parameters referenced by the software during execution. After initialization, the software of the present invention generally flows in two general loops, the first loop generally providing for the actual application of fertilizer with the second loop providing for setup and standby operation. In either loop, the softward periodically checks for a reset signal (via the reset switch on controls 101). If a reset is sensed, any fault flags (for example faults sensed by sensors 80-90) or empty bin flags (as would be set by the software when an empty bin signal is received from any of the various bins or tanks) are cleared and CRT display 110 is updated to so reflect. As used in operation, reset operation 152 would be initiated by the operator after restocking an empty bin or rectifying any mechanical faults in the system.

Software routine 153 is likewise performed by both the operating and standby loops, and provides for verifying the existence of a PROM 103 in the socket 102 (via the PROM existence code) and, when necessary, the painting (drawing) of a new map on CRT 110 and the loading of the PROM's contents into the computer's RAM, which permits faster access to the PROM data during program execution. For example, a map is painted and loaded during the first pass through routine 153 after system power up or after PROM's have been switched.

At decision block 154, the software tests the operate/standby mode switch on the control panel 101 of computer 100. In the standby mode, the software circulates though the standby loop in which it displays command messages 155 as for example entered via interface 112 and acquires updated location speed and soil type information (156) via locator 114, speed indicator 115 and PROM 103 respectively. As will be explained more fully below, this information enables the software to indicate (via a cursor) on the painted field map the location of the truck, and to provide a speed reading, which is also displayed on CRT 110. In addition, as indicated by block 144 of FIG. 7, the software may update the CRT to provide a numeric indication of the soil type which the truck is currently over (this may also be determined by reference to the position of the cursor relative to the soil map). In addition, the keyboard of interface 112 is also read to see if the setup function key has been depressed. Thus, in addition to fertilizing, truck 20 may be used as a locating device to find, for instance, soil samples from each different soil type area in the field.

If a setup function is requested, the software flows from decision block 157 to the setup routine 158, via which setup information may be entered as was explained above with reference to FIG. 7. Otherwise, the program flows directly back to the reset decision block 151.

If the operator/standby switch is in the operate position, routine 165 is performed, which routine is a duplicate of routine 156 described above. However, in the operate mode the software performs the various calculations which are necessary to produce updated product metering control signals (also referred to herein as dispensing signals) to the various feeder apparatus associated with the various bins and tanks (these feeders are represented graphically in FIG. 6 as product meters no. 0-9).

Normally, the loop proceeds through fatal fault decision block 167 to the calculate and set dispensing timer rates routine 166, at which time computer 100 adjusts the various control signals to the product meters 0-9. Once those signals are adjusted, the loop continues to routine 169, at which time various sensors of the system are sampled to check for equipment malfunction or empty bins. If any faults are detected, fault information may be displayed on the CRT 110, and fault flags or empty bin flags may be set.

If a fatal fault is detected at decision block 167, product dispensation is haulted at routine 168, which disables the various control signals to the product meters, conveyer and spreader. Fatal faults include, for example, a feeder malfunction, a conveyer malfunction, a spreader malfunction or an empty product bin or tank. Once a fatal fault is detected, product application may be reinitiated only via fault reset routine 152.

As described generally above, computer 100 controls the rate at which product is metered from the bins to the collecting conveyer according to the speed of the tractor and the soil type which it is currently over. As inferred above, computer 100 determines the particular soil type the truck 20 is over by referencing the soil map read from PROM 103. More particularly, computer 100 first determines the location of the vehicle relative to a particular pixel coordinate on the map, and then looks up the soil type associated with that pixel coordinate. Preferably, the location of truck 20 relative to a particular pixel coordinate on the map is determined as follows. Initially, truck 20 is positioned in the field at the indicated field entry point and a base longitude and latitude reading from locator 114 is acquired. Thereafter, each longitude and latitude reading acquired as truck 20 traverses the field is compared against the base longitude and latitude to develop differential longitude and differential latitude values, which values represent the difference in minutes and seconds between the base longitude and latitude and the current longitude and latitude. The differential values may then be converted to feet, (as is well known in navigation, computer 100 which uses a scaling factor related to latitude to convert latitude differentials to feet) which may then be converted to x and y pixel displacement values using the feet/pixel scaling factor (read from PROM 103). The x and y pixel displacement values may then be added to the base pixel values of the indicated field entrance point to determine an updated location of truck 20 relative to the pixel coordinates of the soil map. Knowing the current location of truck 20 relative to the pixel coordinates of the soil map, the soil type which the truck 20 is currently over may be looked up. In the alternative to determining soil type with reference to the location of the vehicle, the present invention also provides a "manual" mode of operation in which the soil type may be input directly by an operator. Referring to FIG. 8, the manual mode provides that soil type need not be derived from location information and the PROM map as described with reference to routines 156 and 165, but rather may be acquired directly from the operator input 112. Thus, where locator 114 is inoperative, the system may acquire the soil type information directly from the operator, who would vary the input soil type according to visual reference as the truck travels across the field.

Contemporaneously with determining the current soil type computer 100 also acquires a current speed reading from speed indicator 115. Using the soil type and speed and assuming a constant spreader pattern width computer 100 may then determine the rate (cubic feet/sec) at which each product carried in the various bins and tanks should be delivered to conveyor 70 in order to achieve the specified rate (cubic feet/acre) of application to the soil.

As may be readily understood upon reflection, for a desired rate of application $R_A$ in cubic feet/acre the needed rate of dispensation in cubic feet/sec from a bin or tank to the conveyer is a linear function and is directly proportional to the speed (S) of the truck 20. Thus, the frequency (f) of the control signal output by computer 100 to control a product meter (feeder) is also directly proportional to the speed of truck 20 (assuming higher frequencies correspond to higher rates of delivery). Accordingly, computer 100 may determine the needed frequency for each meter control signal using the relationship $f = K R_A \times S$, where K is a proportionally constant related to the width of the spreader's pattern and the mechanical dispensing rate characteristics of the various feeder mechanisms. In FIG. 8, the operation of computer 100 to calculate and set the control signals for each meter is reflected by routine 166. As mentioned above, computer 100 generates the necessary variable frequency control signals via internal timers having programmable time-outs.

Thus, as may be readily appreciated, the present invention provides for control over the rate at which each product or fertilizer component is delivered to each different soil type. Or, in other words, the present invention provides for blending a custom fertilizer for each soil type and delivering each blend to the appropriate soil.

Preferably, computer 100 cycles through a complete operate mode loop as quickly as possible in order that product dispensation rates reflect changes in soil type (as the truck 20 moves from one soil type to another) and truck speed as closely as possible. In the above-described embodiment of the present invention feeder control signals are updated in the range of every three to five seconds. However, it shall be understood that the cycle length is primarily governed by the rate at which updated location and speed information can be obtained from locator 114 and indicator 155 respectively, and calculation delays in computer 100. Accordingly, the substitution of faster equipment (i.e. a faster locator 114 or faster computer) would permit a reduction in cycle length, and thus improve the accuracy of product delivery with respect to changes in soil type or truck speed.

Another factor affecting accuracy of delivery relates to the delay time between dispensation of product onto the conveyer 70 and the actual spreading of the product. As noted above, in the present embodiment of the present invention the conveyer speed is constant. In operation, it introduces about a three second delay between the bins and the spreader (three seconds is an average delay which of course varies with the point of deposit on the conveyer), such that when truck 20 is driven at a typical speed of 20 mph it travels roughly thirty feet in the average time it takes product to reach spreader 75 from the bins. This seeming source of delivery error is, however, compensated for by the throw of spreader 75, which throws product to the rear of truck 20 in an arc of about 30 ft. in radius. If desired, the speed of conveyer 70 could be proportioned to the speed of truck 20 so that such compensation would be maintained for a range of truck speeds.

Thus, as described above the present invention provides an apparatus for delivering specific fertilizer blends to the various different soil types found in a field. As utilized, the control system is initialized as described above and then truck 20 is driven around the field and the products applied. It should be noted that the truck operator is responsible for visually aligning the edges of the fertilizer swaths to assure coverage of the entire field, and for switching between operate and standby mode as may be necessary when turning at the end of a field etc ... such that the same areas are not covered twice. Once a field has been covered once, the control system may be programmed for product runout (the application of excess products left over) at relatively high rates of product application. As mentioned above, the system may inhibit the runout of products which are harmful when applied in excess by referring to the runout attributes of the excess products. Alternatively, excess product may be runout into storage containers in which it may be saved or discarded.

Although the present invention is described above in its preferred form, it shall be understood that various modifications and changes may be made thereto with departing from its spirit and scope. For instance, it is contemplated that x-y locator systems other than LORAN may be employed, and relatedly that other methods may be used for deriving truck position in relation to the soil map. Also, it is contemplated that the soil map could be introduced into computer 100 via magnetic medium such as a magnetic tape etc ... Moreover, it is contemplated that other product feeding and spreading mechanisms could be utilized, for instance a screw conveyer in place of chain conveyer 70. Still further, it is contemplated that a custom fertilizer could be manually blended for each soil prior to application, with the soil locator system of the present invention guiding the application of each custom blend to the soil type for which it is intended. There are, of course, many other modifications which may be made to the method and apparatus of the present invention without departing from the spirit and scope of the claims appended hereto.

What is claimed is:

1. Fertilizer blending and spreading apparatus comprising:
   a vehicle;
   a plurality of product bins mounted on said vehicle, each of said bins for holding a product to be applied to a field to be fertilized;
   a plurality of feeder means mounted on said vehicle, each one of said feeder means operative in response to a feeder control signal for dispensing product at a selected dispensing rate from one of said bins;
   conveying and spreading means mounted on said vehicle for conveying product dispensed from said bins via said feeder means and spreading said product over the ground; and
   control means operatively connected to said plurality of feeder means for generating said feeder control signals to control the rate of dispensation of each of said products, said control means including:
   (a) digital soil map means for storing a digital soil map indicating the distribution of different soil types in said field to be fertilized;
   (b) x-y locator means for indicating the position of said vehicle relative to said field as it moves about said field;
   (c) speed indicator means for indicating the speed of said vehicle as it moves about said field; and
   (d) means responsive to said soil map means, said locator means and said speed indicator means for controlling the generation of said feeder control signals by correlating the location of the vehicle in the field to said map and determining the type of soil the vehicle is currently over and adjusting said feeder control signals in response to the determined soil type and the vehicle speed to provide that each of said products can be applied at different rates to different soil types in the field as the vehicle moves about the field.

2. The apparatus of claim 1 wherein said x-y locator means provides a position in x-y coordinates relative to said field and wherein said control means includes:
   means for storing data representing the location of at least one field starting position relative to said digital soil map; and
   position deriving means for deriving the current position of the vehicle relative to said soil map, said position deriving means including means for determining the location of the vehicle relative to said starting position stored data.

3. The apparatus of claim 2 wherein the x-y locator means includes a LORAN navigation unit.

4. The apparatus of claim 1 wherein the digital soil map means includes means for storing a plurality of discrete data bytes making up a digital soil map, each of said data bytes representative of the soil type of the portion of said field corresponding to said data byte.

5. The apparatus of claim 4 wherein said data bytes are generated by the steps comprising:
(a) acquiring an aerial infrared photograph of said field, the shading of said photograph corresponding to the relative moisture content of said field;
(b) translating said photograph into an array of pixels, each pixel representing a portion of said field;
(c) assigning a discrete value to each pixel based on the shading of said photograph so that each pixel is assigned a value corresponding to the soil type of the area represented by said pixel; and
(d) representing said values in the form of said data bytes.

6. The method of claim 5 further including the step of combining areas of closely akin soil types to reduce the total number of different soil types indicated in the soil map.

7. The method of claim 5 further including the step of revaluing relatively small numbers of pixels dissimilar to adjacent pixel areas such that said small numbers of pixels are treated similarly to said adjacent pixel areas.

8. The apparatus of claim 1 wherein the control means includes product rate indicator means for indicating the rate at which each product is to be applied for different soil types in the field and wherein the control means includes means for adjusting said feeder control signals in response to the indicated rate for the currently determined soil type.

9. Fertilizer blending and spreading apparatus according to claim 1, wherein said x-y locator means includes means for indicating said vehicle location relative to said field to said control means as said location is determined visually by the operator.

10. Fertilizer blending and spreading apparatus according to claim 1 further comprising:
first means mounted on the vehicle for sensing the operation of one or more of said feeder means and generating a failure signal when a failure is detected;
second means mounted on the vehicle for sensing the operation of the conveying and spreading means and generating a failure signal when a failure is detected; and
wherein said control means includes means responsive to said first and second sensing means for halting the operation of the apparatus when a failure signal is generated by at least one of said first and second sensing means.

11. A fertilizer blending and spreading apparatus according to claim 1 further comprising:
means mounted on each of said product bins for sensing the presence of products in said bins and wherein said control means includes means responsive to said product sensing means for halting spreading operation when a required product has run out.

12. A fertilizer blending and spreading apparatus comprising:
a vehicle;
a plurality of product bins mounted on said vehicle, each of said bins for holding a product to be applied, to a field to be fertilized;
a plurality of feeder means mounted on said vehicle, each one of said feeder means operative in response to a feeder control signal for dispensing product at a selected dispensing rate from one of said bins;
conveying and spreading means mounted on said vehicle for conveying product dispensed from said bins via said feeder means and spreading said product over the ground; and
control means operatively connected to said plurality of feeder means for generating said feeder control signals to control the rate of dispensation of each of said products, said control means including:
(a) a digital soil map means for holding a soil map indicating the distribution of different soil types in said field to be fertilized;
(b) x-y locator means for indicating the position of said vehicle relative to said field as it moves about said field;
(c) speed indicator means for indicating the speed of said vehicle as it moves about said field;
(d) product location and product rate indicator means for indicating the type of product held in a bin and the desired rate at which each product is to be applied for different soil types in the field; and
(e) control means responsive to said soil map means, x-y locator means, speed indicator means and product location and product rate indicator means for controlling the generation of said feeder control signals, said control means including:
(i) means for acquiring updated location and speed information from said x-y locator means and said speed indicator means, respectively;
(ii) means for determining the type of soil the vehicle is currently over by correlating said vehicle location to said soil map; and
(iv) means for repeatedly performing calculations based on the vehicle speed and the desired product rates for the soil type the vehicle is currently over to determine current product dispensing rates for each product being distributed and for producing said feeder control signals in accordance with said determined dispensing rates and the location of said products in said bins so that each of said products is applied to the different soil types in the field at the desired product rate as the vehicle moves about the field.

13. The apparatus of claim 12 wherein the control means for generating feeder control signals includes means for generating a control signal output the frequency of which is proportional to the rate of dispensing product and the speed of the vehicle.

14. A method for distributing fertilizer on a field to be fertilized from a distributing vehicle carrying a plurality of products in a plurality of product bins comprising the steps of:
(a) providing a digital soil map;
(b) determining the x-y location relative to said map of said distributing vehicle in said field;
(c) determining the speed of said distributing vehicle;
(d) determining from the soil map the type of soil located where said vehicle is located;
(e) determining the product rate at which product should be applied to said field based on the type of product and the needs of said soil type determined in step (d); and
(f) feeding, conveying and spreadying said products from said product bins at dispensing rates proportionate to said determined product rates and vehicle speed.

15. The method of claim 14 wherein step (a), providing a digital soil map, includes the steps of:
 (i) acquiring an infrared photograph of said field to be fertilized
 (ii) digitizing said infrared photograph to produce a digital soil map in which the soil types of the field are represented by bytes of data corresponding to discrete areas of the field; and
 (iii) transferring said digital soil map to a nonvolatile computer-reading memory.

16. The method of claim 15 wherein the step of digitizing said infrared photograph includes the steps of:
 (i) translating said photograph into an array of pixels, each pixel representing a portion of the total field to be fertilized; and
 (ii) assigning a discrete digital value to each pixel based on the shading of said photograph so that the value assigned corresponds to the soil map of the area represented by said pixel.

17. The method of claim 15 further including the steps of:
 enhancing said digital soil wherein said enhancing step includes the steps of:
 (i) combining areas of closely akin soil types to reduce the total number of soil types described; and
 (ii) revaluing small areas of said field dissimilar to adjacent areas such that said small areas are treated similarly to said adjacent areas.

18. The method of claim 14 wherein the step (e) of determining the product rate includes the further steps of:
 (i) acquiring digital soil map data for said field;
 (ii) positioning a soil sampling device in said field and acquiring a soil sample for each different soil type identified in said soil map data; and
 (iii) analyzing said samples to determine product rates for each soil type.

* * * * *